United States Patent [19]

Popelka et al.

[11] Patent Number: 5,085,251
[45] Date of Patent: Feb. 4, 1992

[54] RECTANGULAR FLEXIBLE DUCT

[75] Inventors: Andrew Popelka, Acton; Paul H. Sarkisian, Watertown, both of Mass.

[73] Assignee: Electric Power Research Institute, Calif.

[21] Appl. No.: 544,840

[22] Filed: Jun. 27, 1990

[51] Int. Cl.⁵ ............................................. F16L 11/11
[52] U.S. Cl. .................... 138/119; 138/121; 138/128; 138/157; 138/173
[58] Field of Search ............ 52/108, 406; 98/DIG. 7; 138/118, 119, 121, 128, 157, 158, 162, 163, 172, 173; 174/101, 68.3

[56] References Cited

.U.S. PATENT DOCUMENTS 2,821,896  7/1952  Kice et al. .
3,811,633  5/1974  Cummings et al. .............. 52/108 X
3,818,948  6/1974  Hedges .

Primary Examiner—Richard E. Chilcot, Jr.
Assistant Examiner—Robert Canfield
Attorney, Agent, or Firm—Flehr, Hohbach, Test, Albritton & Herbert

[57] ABSTRACT

A rectangular, flexible duct serves as an alternative to galvanized sheet metal duct work installed in homes by utilizing corrugated semi-rigid top and bottom walls with relatively flexible connecting side walls so that the duct may be easily rolled and stored. But when unrolled, it is fastened, for example, between floor joists of a home by use of an overhanging flange formed by one of the top or bottom walls. The duct walls are made of heat resistant plastic suitable for heating and ventilating. Rigidity is provided in the top and bottom walls by corrugations or ribs formed in the plastic.

5 Claims, 4 Drawing Sheets

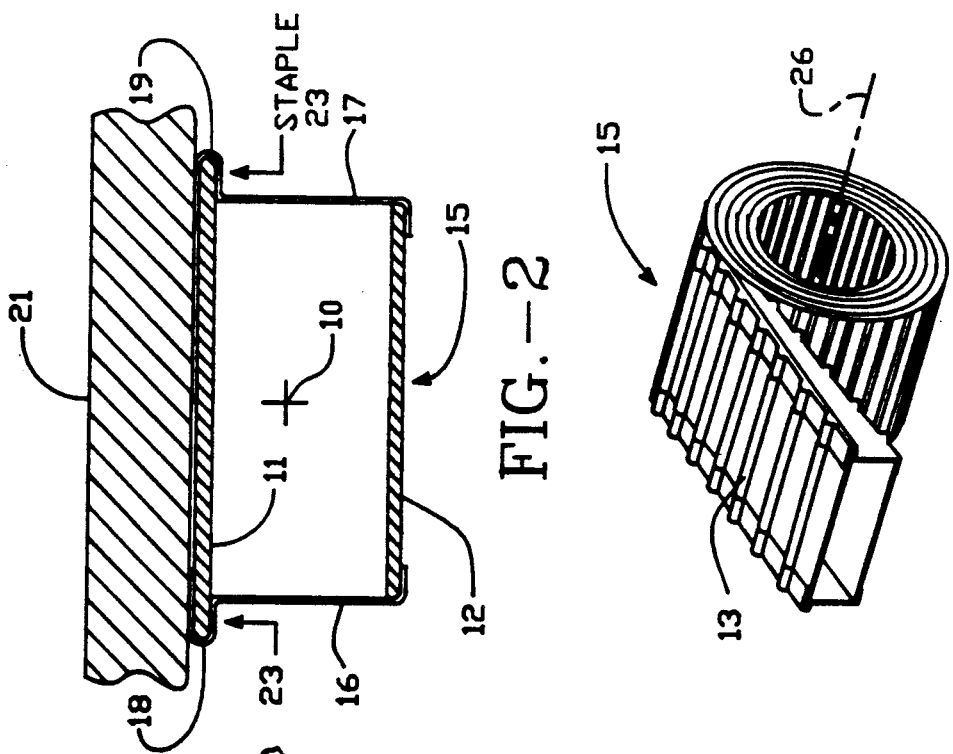
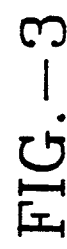
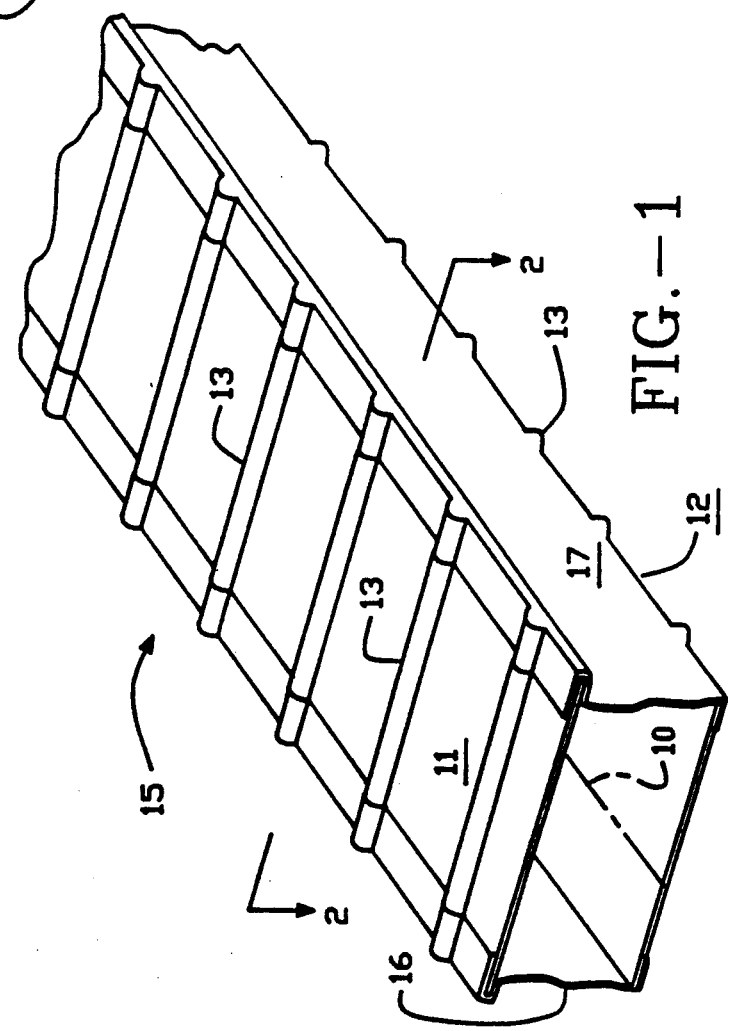

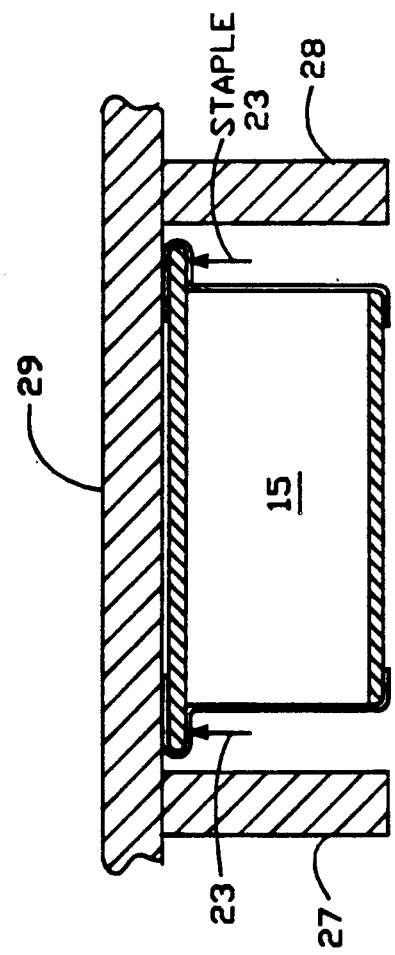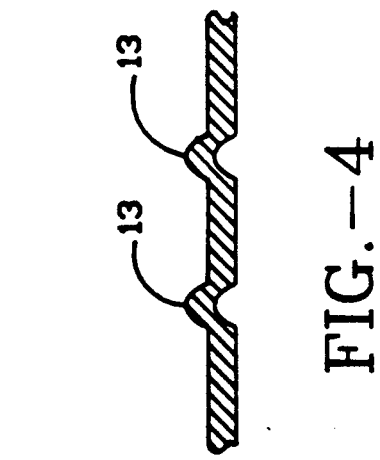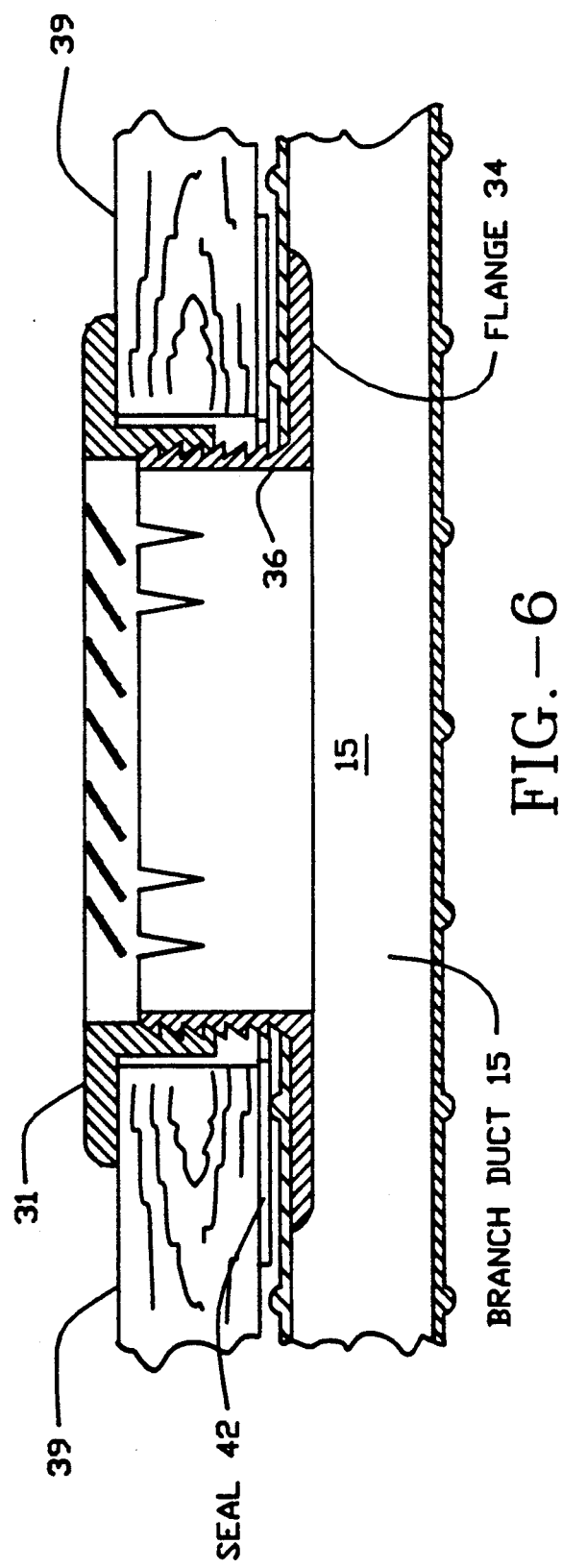

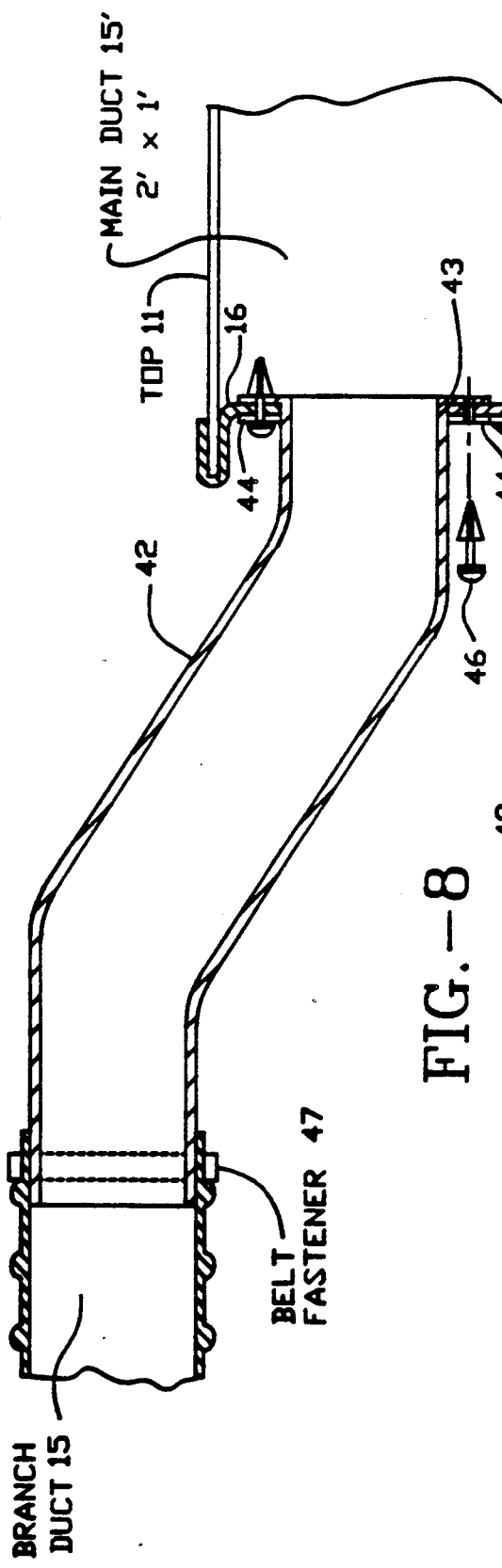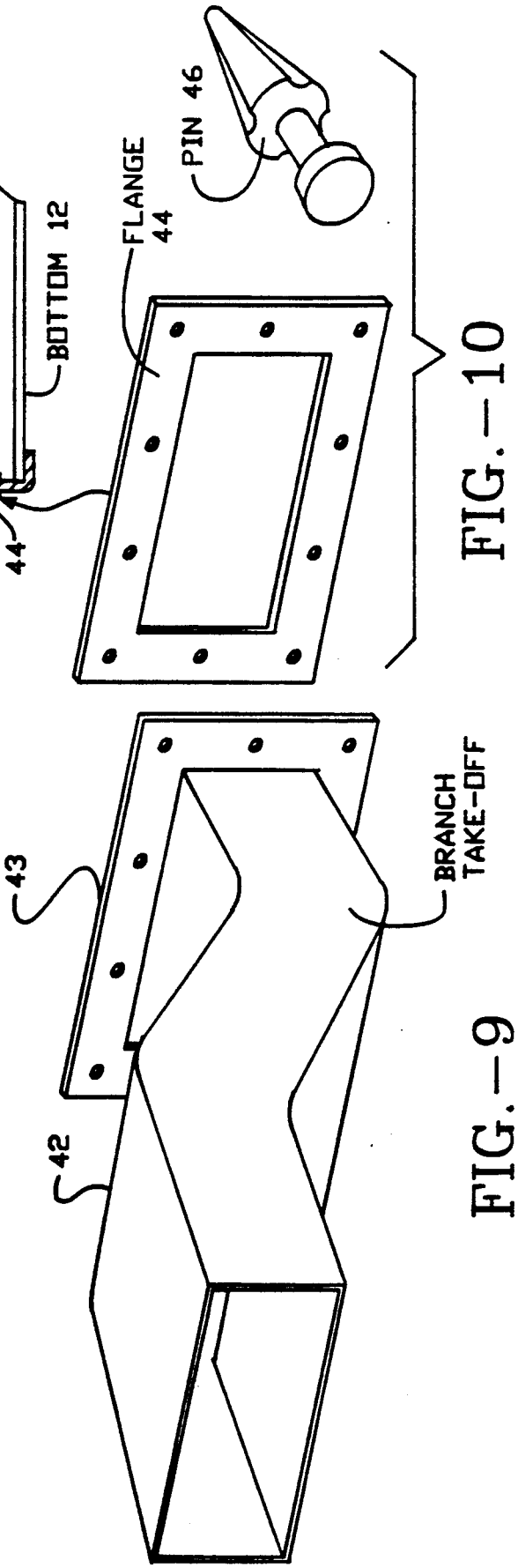

RECTANGULAR FLEXIBLE DUCT

BACKGROUND OF THE INVENTION

The present invention is directed to a rectangular flexible duct, and more particularly to a heating and ventilating duct which is collapsible and rollable.

Heating and ventilating ducts, especially for home use, are at the present time constructed of rectangular rigid sheet metal or fiberglass, or in the form of a flexible plastic tube which has a continuous spiral of wire within it. In any case, it is expensive, bulky, difficult to transport, requires a large storage space and requires pre-sizing.

Flexible and foldable, and in fact, rollable air flow conduits have been suggested, as shown in Kice Patent No. 2,821,896 and Hedges Patent No. 3,818,948. Kice shows a fiberglass duct which is collapsible on its four corners and rollable and has a very specific use for a wall space. All the walls of the rectangular duct are of the same fiberglass material. It is not rigid enough nor usable under flooring for general home heating and ventilating use. It is also difficult to roll.

The Hedges patent again shows a rectangular duct which is collapsible at its four corners. However, because of its stiffening arrangement (although it is somewhat bendable), it is not rollable.

Thus, as is apparent from the above prior art, attempts have been made to remedy the deficiencies of, for example, rigid sheet metal ducts, but they have not been totally successful.

OBJECT AND SUMMARY OF INVENTION

It is therefore an object of the present invention to provide an improved rectangular flexible duct.

In accordance with the above object, there is provided a rectangular, collapsible and rollable heating and ventilating duct having a continuous extended length along a predetermined extended axis comprising top and bottom walls above and below the extended axis formed of relatively semi-rigid hard but flexible plastic-like material reinforced for rigidity by spaced rib means perpendicular to the extended axis but rollable around a roll axis with said ribs forming elements of the roll parallel to said roll axis. A pair of side walls connects the top and bottom walls to form an airtight duct, the side walls being relatively flexible and collapsible to allow said top and bottom walls to be pushed together and to allow the pushed together combination to be rolled up around said roll axis.

BRIEF DESCRIPTION OF DRAWINGS

FIG. 1 is a perspective view of a flexible duct embodying the present invention.

FIG. 2 is a cross-sectional view along the line 2—2 of FIG. 1 and in addition, shows one type of actual installation of the duct.

FIG. 3 is a perspective view of the duct of the present invention rolled up.

FIG. 4 is an enlarged cross-sectional view of the top wall of the duct showing its corrugations.

FIG. 5 is a cross-sectional view similar to FIG. 2 but shows the duct mounted in a floor location crosswise to FIG. 2.

FIG. 6 is a cross-sectional view showing the duct of the present invention and its coupling to a louver installed in a floor.

FIG. 8 is a cross-sectional view illustrating the connection of a branch duct to a main duct.

FIG. 9 is a perspective view of a portion of FIG. 8.

FIG. 10 is a perspective view of another portion of FIG. 8.

DETAILED DESCRIPTION OF PREFERRED EMBODIMENTS

Figure 7:
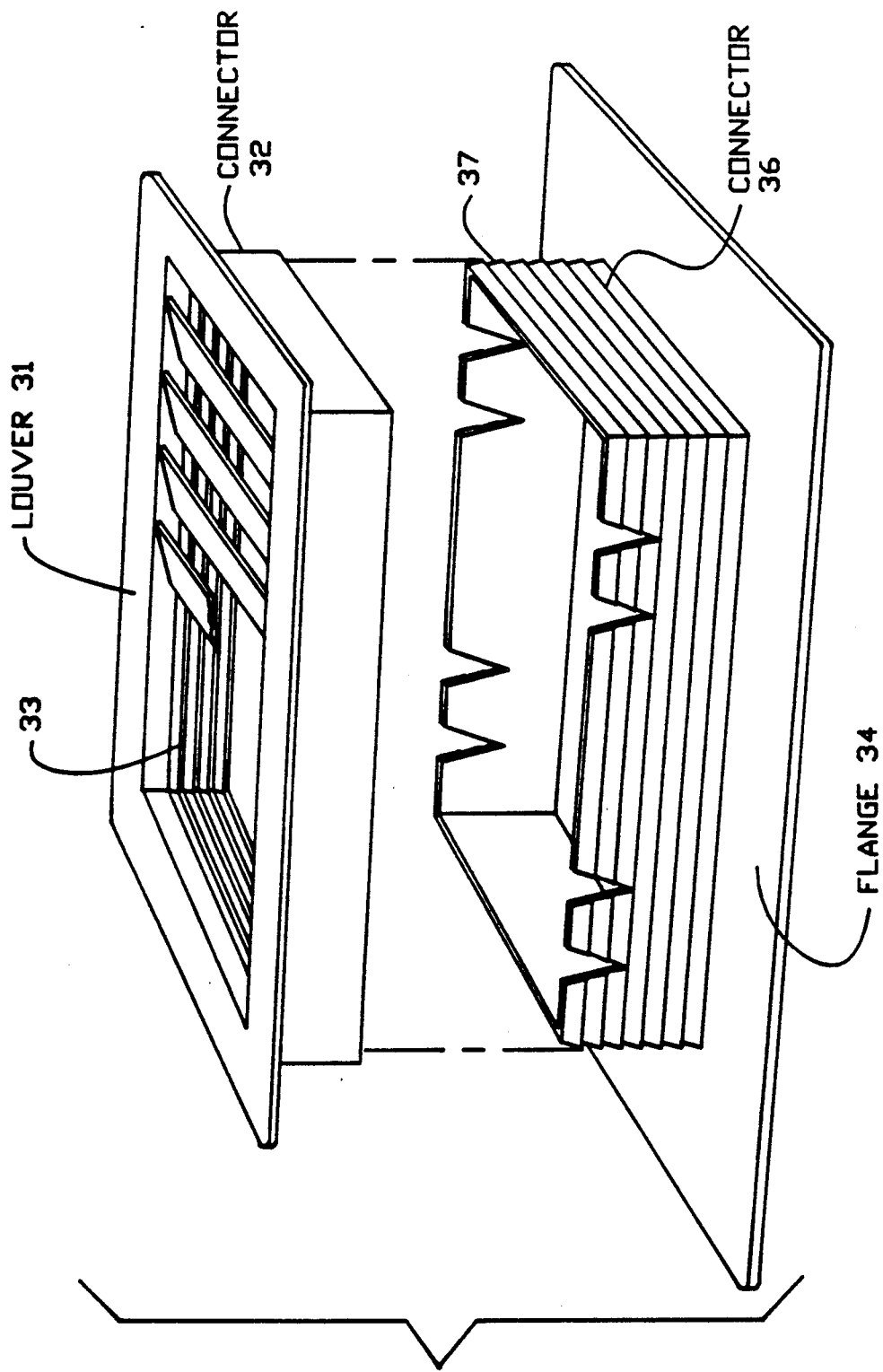
FIG. 7 is an exploded view in perspective of a portion of FIG. 6.

The rectangular flexible duct 15 of the present invention is shown in full perspective view in FIG. 1 as it would appear in a continuous extended unrolled length along the axis 10. (See also FIG. 2.) The duct 15 includes top and bottom walls 11 and 12 which are of substantially equivalent construction and are relatively semi-rigid hard but flexible plastic-like materials reinforced for rigidity by spaced ribs 13, which are perpendicular to axis 10. The ribs 13 eliminate deflection in the direction perpendicular to main axis 10 of the duct and provide rigidity for the overall rectangular configuration of the duct.

A pair of side walls 16 and 17 connects the top and bottom walls to form the airtight duct 15. As best illustrated in FIG. 2, the top wall 11 is of a greater width than the bottom wall 12 to thus provide the overhang or flanges 18 and 19. The side material 16 and 17 is then wrapped around the lengthwise edges of the top duct 11 and fastened either by adhesion or heat welding. The same is true of the side walls fastening to the bottom wall 12, as indicated.

The flanges 18 and 19, as illustrated in FIG. 2, thus provide for a convenient technique of fastening to, for example, the floor joists 21 of a home by means of staples 23. Here duct 15 hangs under joists 21 running crosswise to them.

In general, the semi-rigid material of the top and bottom walls 11 and 12 is a plastic-type material which may be a polycarbonate, polyvinyl chloride or any engineering plastic (e.g., ULTEM made by G.E. Plastics). In either case, it is of the thermo-plastic family. What is necessary is that the top and bottom walls be rollable, as illustrated in FIG. 3, after being pressed together around a roll axis 26. At the same time the ribs 13, which thus form elements of the roll parallel to the roll axis, provide sufficient rigidity for installation, as illustrated in FIG. 2.

In addition, the side walls are of relatively flexible material compared to the top and bottom walls. Thus, side walls 16 and 17 can also be a polyvinyl chloride, polystyrene or engineering plastic and might have a flexibility similar to, for example, a plastic trashbag. It could also be a plastic coated fabric. Typically, the thickness of the top and bottom walls 11 and 12 would be approximately 20 mils. And the side walls would be relatively thinner. In any case, the flexibility of the side walls is such that they allow the top and bottom walls to be pushed together to allow the combination to be rolled up around the roll axis, as illustrated in FIG. 3, and thus conveniently stored and transported. The flexibility of the sidewalls easily accommodates the sliding movement of the top wall against the bottom wall because of their different effective roll diameters.

Upon installation, as shown in FIG. 2, the duct expands either by the weight of, for example, the bottom wall 12 or by the low pressure heating or ventilating air which is transported through the duct.

Since the duct will be used for heating and ventilating, the material of the duct must of course have proper characteristics for such use. This includes a melting point of approximately 265° F. or more and low smoke generation and low surface burning characteristics. A V-O rated polycarbonate will provide these characteristics.

FIG. 4 illustrates, in enlarged form, the corrugation or ribs 13, in the top or bottom wall 11 or 12 which may be formed by a plastic extrusion process.

Alternatively, a plastic sheet need be merely squeezed together at the corrugation points to provide for increased rigidity in that axis. Finally, other techniques such as forming multi-layer plastic top and bottom walls may be used with one of the layers having corrugations and the other providing additional stiffening.

The side walls, of course, must be flexible enough so that the top and bottom walls collapse upon themselves without any offset. Also, they must have some "give" to accommodate rolling. For contrast, see both the above-mentioned Kice and Hedges patents where the duct is foldable but only along its longitudinal axis 10; that is, at the corners of the duct.

Another mode of installation is illustrated in FIG. 5 where between the floor joists 27 and 28, which support the floor 29, the duct 15 may be inserted between the joists (which normally have a spacing between sides of the joists of 14¼") and then stapled to floor 29 with the staples 23. Here the duct 15 extends within the joist spacing. Such a duct might thus have a dimension of 14" by approximately the full width of the joist; viz., 4–8".

A typical floor installation of duct 15 is illustrated in FIG. 6. Referring briefly to FIG. 7, this includes a louver 31 with associated connector 32 having internal ratchets or steps 33 and a flange 34 with a connector 36 having external steps or ratchets 37. These two connectors are sized to mate and lock with one another.

Now referring to FIG. 6, a completed installation is illustrated. It is constructed by first cutting a hole or aperture 38 in the floor 39 suitable for placement of louver 31. Then a hole 41 is cut in the duct 15, into which may be fitted the flange 34 with its connector 36 extending. Louver 31 and flange 34 are then pushed together, as illustrated, with the connectors 36 and 33 ratcheting together to form a fixed installation. In addition, flange 34 abuts against the floor 39 with the aid of a sealing material illustrated at 42 to seal against the floor 39 to provide an airtight duct installation. This duct could either be directly under the floor, as illustrated in FIG. 5, or hanging from the floor joists, as illustrated in FIG. 2. In either case, the connectors would have to be properly sized. Such connectors would typically be of injection molded plastic.

Another technique of installation is illustrated in FIG. 8 where a branch duct 15 which typically might have a dimension of 14" by 2 to 8" to fit between the floor joists is connected to a main duct 15', typically having dimensions of 2 ft. ×1 ft. Here the flexible side wall 16 of the main duct has an aperture cut in it and/or a plastic branch takeoff duct 42, as illustrated in FIG. 9, with a flange 43 is placed in the aperture in the side wall, as indicated. Then the matching flange 44 illustrated in FIG. 10 is slid over the branch 42 and fastened to the flange 43 with the side wall material 16 between them by means of the pin type fasteners 46. Finally, the branch takeoff 42 is fastened to the branch duct 15 by a belt fastener 47, as illustrated in FIG. 8. The fastener is merely a belt that compresses the flexible material of the branch duct 15 around the sheet metal or plastic material of the branch takeoff 42.

Thus, the present invention has provided a rectangular flexible duct which is collapsible and rollable, minimizing storage space and facilitating transportation. Because of its structural features, such as the corrugated semi-rigid top and bottom walls, it may be easily used in all aspects of home heating and ventilating.

What is claimed:

1. A rectangular, collapsible and rollable heating and ventilating duct having a continuous extended length along a predetermined extended axis comprising:

top and bottom walls above and below said extended axis formed of relatively semi-rigid hard but flexible plastic-like material reinforced for rigidity by spaced rib means perpendicular to said extended axis but rollable around a roll axis with said ribs forming elements of said roll parallel to said roll axis;

a pair of side walls connecting said top and bottom walls to form an airtight duct, said side walls being relatively flexible and collapsible to allow said top and bottom walls to be pushed together and to allow the pushed together combination to be rolled up around said roll axis, said side walls accommodating the different effective roll diameters of said top and bottom walls.

2. A rectangular duct as in claim 1 where all of said walls are composed of material having a melting point of at least approximately 265 with low smoke generation and low surface burning characteristics.

3. A rectangular duct as in claim 1 where said rib means include corrugations formed in said top and bottom walls.

4. A rectangular duct as in claim 3 where said rib means are formed by an extrusion process.

5. A rectangular duct as in claim 1 where the width of one of said top and bottom walls is greater than the other to form overhanging flanges formed by said flexible sidewall material being wrapped around said semi-rigid top or bottom wall, whereby said unrolled duct may be stapled in place.

* * * * *